US005368791A

United States Patent [19]

Uchida et al.

[11] Patent Number: 5,368,791

[45] Date of Patent: Nov. 29, 1994

[54] METHOD OF PRODUCING PATTERNED SHAPED ARTICLE

[75] Inventors: Hiroshi Uchida, Ashikaga; Mituhiro Onuki, Kiryu; Hideo Watanabe, Ashikaga, all of Japan

[73] Assignee: CCA Inc., Tokyo, Japan

[21] Appl. No.: 767,815

[22] Filed: Sep. 30, 1991

[30] Foreign Application Priority Data

Oct. 1, 1990 [JP] Japan .................................. 2-260433
Oct. 1, 1990 [JP] Japan .................................. 2-260434

[51] Int. Cl.[5] ........................ B28B 1/08; B29C 39/12; C04B 33/32; E04B 1/16

[52] U.S. Cl. ........................................ 264/35; 264/23; 264/42; 264/60; 264/63; 264/71; 264/86; 264/87; 264/102; 264/113; 264/122; 264/125; 264/128; 264/245; 264/255; 264/256; 264/313; 264/317; 264/332; 264/333; 264/334

[58] Field of Search ................. 264/245, 35, 255, 313, 264/316, 317, 332, 333, 334, 336, DIG. 31, 128, 122, 125–127, 60, 63, 112, 113, 42, 71, 23, 256, 86, 87, 102

[56] References Cited

U.S. PATENT DOCUMENTS

| | | | |
|---|---|---|---|
| 525,202 | 8/1894 | Granjon et al. | 264/317 |
| 534,664 | 2/1895 | Polivka | 264/245 X |
| 537,703 | 4/1895 | Mueller | 264/245 |
| 723,281 | 3/1903 | Jacques | 264/256 |
| 827,287 | 7/1906 | Bidtel | 264/246 X |
| 836,638 | 11/1906 | Ducker | 264/256 |
| 868,261 | 10/1907 | Geanakopulos | 264/245 X |
| 1,019,414 | 3/1912 | Bellamy | 264/245 |
| 1,087,974 | 2/1914 | Owen | 264/317 |
| 1,453,382 | 5/1923 | D'Alessandro et al. | 264/245 |
| 1,471,990 | 10/1923 | Wert | 264/DIG. 43 X |
| 1,524,824 | 2/1925 | Henroz | 264/245 X |
| 1,641,404 | 9/1927 | Washington | 264/245 |
| 1,666,232 | 4/1928 | Boynton | 264/246 |
| 1,888,492 | 11/1932 | Dearden | 264/245 X |
| 2,007,961 | 7/1935 | Bolton | 25/42 |
| 2,434,477 | 1/1948 | Winter | 264/245 X |
| 3,133,133 | 5/1964 | Fairbanks | 264/317 X |
| 3,515,619 | 6/1970 | Barnette . | |
| 3,795,721 | 3/1974 | Gilbert et al. | 264/DIG. 43 X |
| 4,094,941 | 6/1978 | Manners et al. | 264/256 X |
| 4,123,582 | 10/1978 | Musyt | 264/317 X |
| 4,213,929 | 7/1980 | Dobson | 264/317 X |
| 4,247,508 | 1/1981 | Housholder | 264/317 X |
| 4,250,127 | 2/1981 | Warren et al. | 264/317 X |
| 4,700,518 | 10/1987 | Akihama et al. | 52/309.16 |
| 4,787,597 | 11/1988 | Yokota et al. | 264/86 X |
| 4,871,497 | 10/1989 | Natori et al. | 264/317 X |
| 4,923,664 | 5/1990 | Kossatz et al. | 264/256 |
| 5,009,387 | 4/1991 | Scott et al. | 264/35 X |

FOREIGN PATENT DOCUMENTS

| | | | |
|---|---|---|---|
| 227510 | 5/1958 | Australia | 264/317 |
| 73377/74 | 3/1976 | Australia . | |
| 0000837 | 2/1979 | European Pat. Off. . | |
| 0191409 | 8/1986 | European Pat. Off. | 264/317 |
| 0374956 | 6/1990 | European Pat. Off. . | |
| 667109 | 10/1929 | France . | |
| 2800296 | 7/1978 | Germany | 264/245 |
| 51-2759 | 1/1976 | Japan | 264/245 |

*Primary Examiner*—Karen Aftergut
*Attorney, Agent, or Firm*—Oblon, Spivak, McClelland, Maier & Neustadt

[57] ABSTRACT

A method of producing a patterned shaped article includes the steps of disposing at a prescribed position within a main form for molding the shaped article a cell form having a plurality of cells arranged in a contiguous manner, charging a prescribed amount of dry pattern-course material for forming the pattern course of the shaped article into prescribed cells of the cell form, charging a base-course material for forming the base course of the shaped article into the remaining space of the main form not filled with the pattern-course material, removing the cell form, causing the charged pattern-course material and base-course material to set into a shaped article, removing the shaped article from the main form and, optionally, sintering the shaped article.

46 Claims, 9 Drawing Sheets

METHOD OF PRODUCING PATTERNED SHAPED ARTICLE

BACKGROUND OF THE INVENTION

1. Field of the Invention

This invention relates to a method of producing patterned shaped articles including shaped concrete articles and shaped artificial stone articles such as paving blocks and the like used for surfacing sidewalks and roads, and wall, ceiling and floor slabs used for building purposes, and shaped ceramic articles such as paving tiles, wall tiles, porcelain wares, sintered rock, glass, flameproof materials and other structural materials.

2. Prior Art Statement

The conventional method of providing a paved surface constituted of paving blocks with a pattern indicating, for example, a crosswalk, a stop intersection or other such traffic control mark has been either to apply paint to the surface in the desired pattern or to inlay the surface with another material in the desired pattern. On the other hand, the patterning of ceramic material surfaces has conventionally been carried out exclusively by pattern transfer, printing or inlaying.

Since the patterns painted on the surface of paving blocks are exposed to abrasion from pedestrians' shoes and/or vehicle tires and the like, they quickly wear off and have to be redone at frequent intervals, at a considerable cost in terms of labor and materials. Where the pattern is formed by inlaying, the work itself is troublesome and very costly.

The object of the present invention is to provide a method for easily producing patterned shaped articles capable of maintaining their patterns in excellent condition even when exposed to surface abrasion.

SUMMARY OF THE INVENTION

For realizing this object, the present invention provides a method of producing a patterned shaped article comprising the steps of disposing at a prescribed position within a main form for molding the shaped article a cell form having a plurality of cells of the same height arranged in a contiguous manner, charging a prescribed amount of dry material for pattern-course formation into the prescribed cells of the cell form, charging a base-course material for forming the base course of the shaped article into the remaining space of the main form not filled with the pattern-course material, removing the cell form by a suitable method, causing the charged pattern-course and base-course materials to set into a shaped article, removing the shaped article from the main form and, optionally, sintering the shaped article.

When a pattern-course material and a base-course material consisting mainly of cement and/or resin are charged into the prescribed cells of the cell form within the main form and allowed to set into an integral mass by virtue of their water content, there is obtained a patterned concrete shaped article.

When a pattern-course material and a base-course material consisting mainly of aggregate are charged into the prescribed cells of the cell form within the main form and caused to set into an integral mass by use of a curing material, there is obtained a patterned artificial stone shaped article.

Moreover, when a pattern-course material and a base-course material consisting mainly of sinterable material are charged into the prescribed cells of the cell form within the main form, the charged materials are formed under pressure into a raw product, and the unmolded raw product is sintered, there is obtained a patterned ceramic shaped article.

Since the pattern course of the patterned shaped article produced according to the method of this invention can be formed to whatever thickness is desired, the pattern does not wear off or become unsightly even when the surface of the shaped article is subjected to abrasion or fouling. In addition, the cell form having a plurality of cells is disposed at a prescribed position within the main form and a base-course material and a pattern-course material are charged into the prescribed cells by use of a mask or the like and, therefore, it becomes possible to produce even complexly patterned shaped articles with ease.

The above and other features of the invention will become apparent from the following description made with reference to the accompanying drawings.

BRIEF DESCRIPTION OF THE DRAWINGS

FIG. 4(*b*) is a perspective view showing part of another example of the cell form.

DESCRIPTION OF THE PREFERRED EMBODIMENTS

Figure 1:
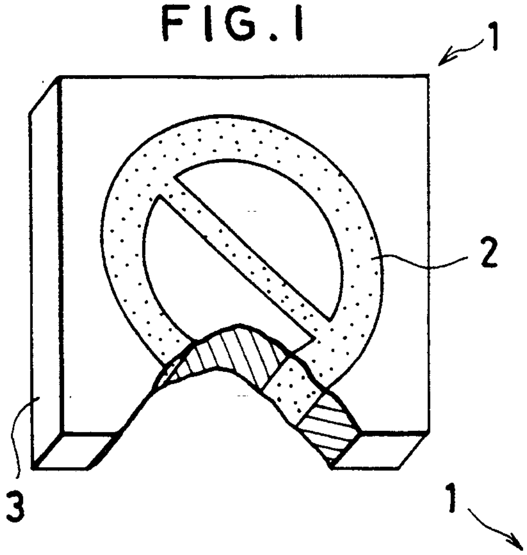
FIG. 1 is a partially cutaway perspective view of a first embodiment of a patterned shaped article produced according to the method of the invention.
Figure 2:
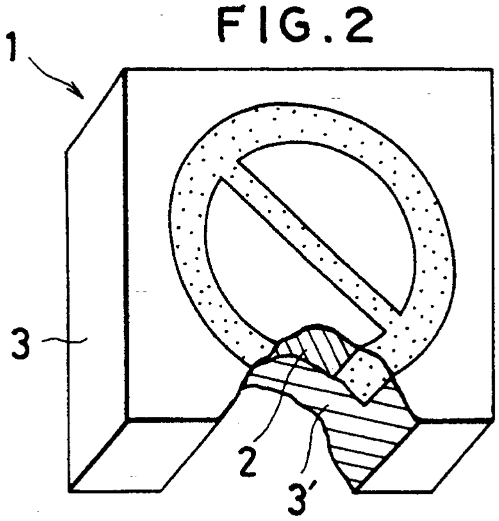
FIG. 2 is a partially cutaway perspective view of a second embodiment of a patterned shaped article produced according to the method of the invention.
Figure 3:
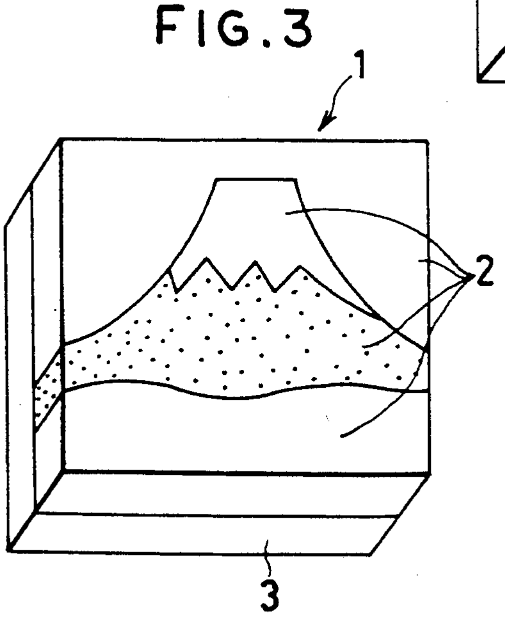
FIG. 3 is a perspective view of a third embodiment of a patterned shaped article produced according to the method of the invention.

FIGS. 1, 2 and 3 respectively show patterned shaped articles produced according to first, second and third embodiments of the present invention. FIGS. 1 and 2 show examples having a traffic control mark, and FIG. 3 shows an example having a pattern.

Figure 5:
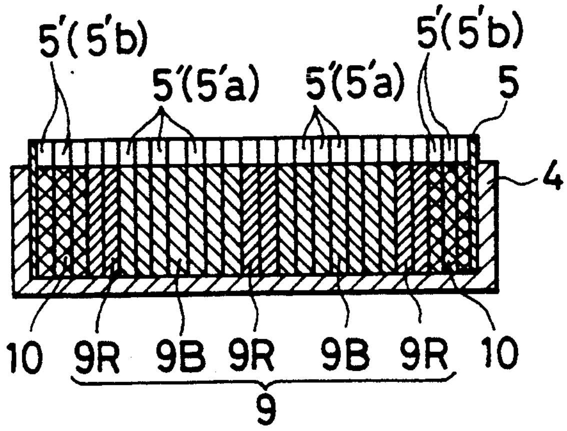
FIG. 5 is a sectional view showing the mode in which the shaped article of FIG. 1 is produced.

The shaped article of FIG. 1 is formed of a pattern course 2 and a base course 3 which are of equal thickness. The pattern course 2 is exposed at specific portions of the shaped article surfaces. As will be explained in more detail later, this shaped article is produced by charging prescribed cells (form cavities) 5'a of a cell form 5 disposed within a main form 4 with a pattern-course material 9 of prescribed thickness and charging form cavities 5'b not filled with the pattern-course material 9 with a base-course material 10 of the same thickness (FIG. 5). In the case of the shaped article of FIG. 2, the pattern course 2 is exposed at a specific portion on the front surface of the shaped article 1, while the rear surface of the shaped article is formed solely of the base course 3. Specifically, the portion 3' of the base course 3 located underneath the pattern course 2 is relatively thin while the portion thereof that is also exposed on the front surface is thick. As will be explained in more detail later, the shaped article of FIG. 2 is produced by charging the prescribed form cavities 5' of the cell form 5 disposed within the main form 4 with pattern-course material 9 in a prescribed amount and charging all of the space within the main form inclusive of the form cavities charged with the pattern-course material 9 with base-course material 10 so as to have a uniform thickness as a whole (FIG. 6) or by charging all of the form cavities with the base-course material 10 in a prescribed amount and then charging the prescribed form cavities with the pattern-course material 9 and the remaining cavities with the base-course material 10 so as to have a uniform thickness as a whole (FIG. 7).

Figure 8:
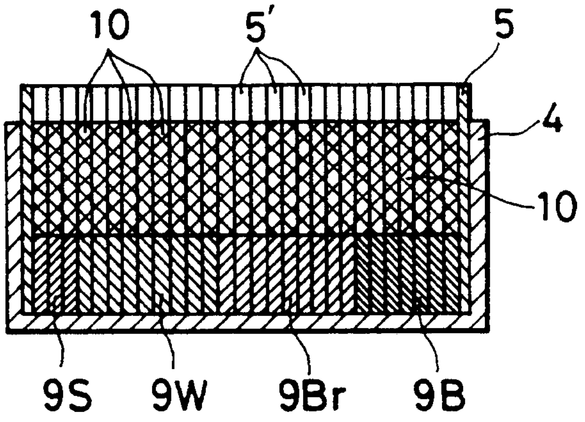
FIG. 8 is a sectional view showing the mode in which the shaped article of FIG. 3 is produced.

In the shaped article of FIG. 3, the pattern course 2 is exposed over the whole front surface and the rear surface is formed of the base course 3, which is not exposed at the front surface. As will be explained in more detail later, this shaped article is produced by charging all the cells 5' of the cell form 5 disposed within the main form 4 with pattern-course materials 9S, 9W, 9Br and 9B having different colors in their respectively prescribed amounts and then charging all the cells with base-course material 10 on the pattern-course materials (FIG. 8). The order of the charging operations of the pattern-course material 9 and base-course material 10 can be freely selected in the production of all shaped articles according to this invention.

Figure 4A:
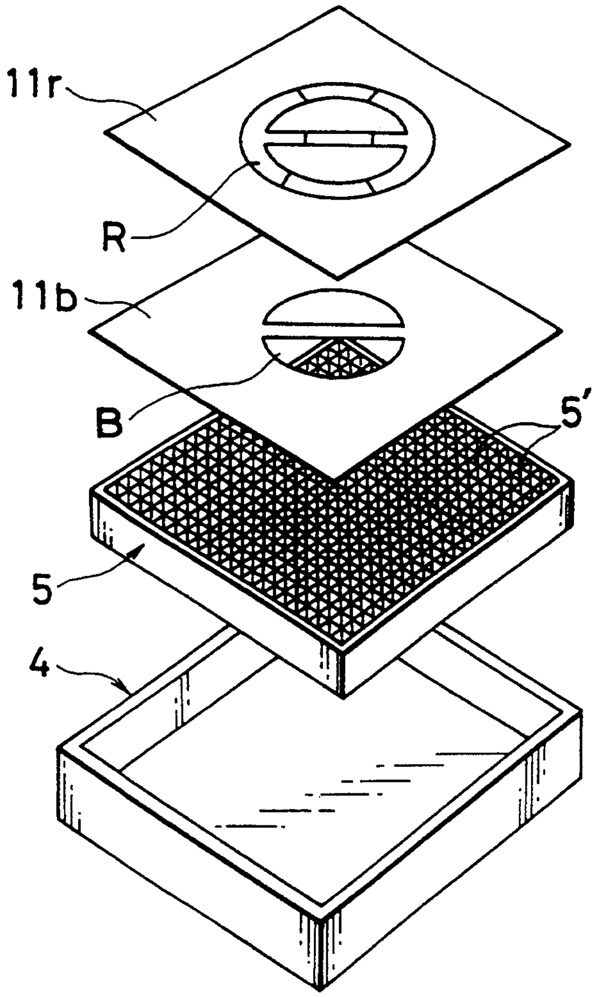
FIG. 4(*a*) is a plan view of a main form, a cell form and masks used for producing the shaped article of FIG. 1.
Figure 4B:
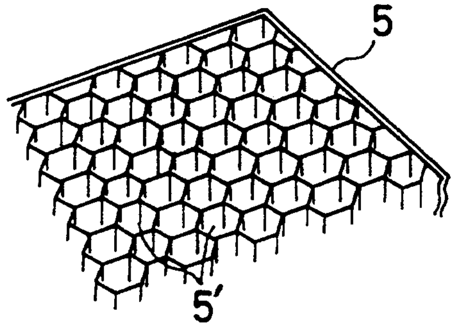
Figure 13:
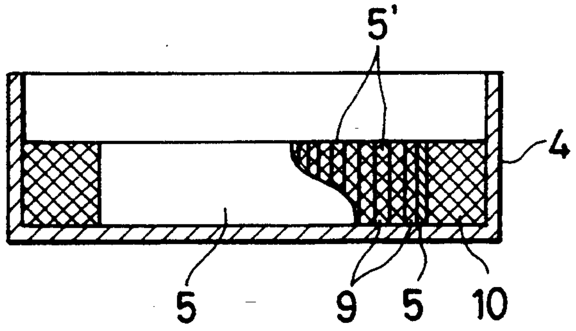
FIG. 13 is a sectional view showing the state in which the cell form is disposed within the main form.

The shaped articles which, as shown in FIGS. 1, 2 and 3, have their pattern courses 2 exposed at all or a part of their front surfaces are produced by using a main form 4 and a cell form 5 having a plurality of cells 5' of the same height arranged in a contiguous manner as shown in FIG. 4(*a*) and making the pattern course 2 of dry pattern-course material and the base course 3 of base-course material. The cells 5' of the cell form 4 are of the same size in the form of a square as a typical example shown in FIG. 4(*a*) or hexagon as another typical example shown in FIG. 4(*b*) in cross section having a height the same as or larger than the thickness of a pattern course to be formed and sides of about 1 to 50 mm in the case of the square and of about 0.5 to 30 mm in the case of the hexagon. The cell form 5 has a size conforming to the inside size of the main form 4. However, it need only have a size slightly larger than the outer configuration of a pattern to be formed. The shape of the cells should not be limited to the aforementioned square and hexagon, but may be a circle, triangle, rectangle, optional shapes or any combination thereof. The cell form 5 need only have a shape capable of being accommodated within the main form 4 as shown in FIG. 13.

In the case of producing a concrete shaped article, the pattern-course material charged in the predetermined cells 5' of the cell form 5 within the main form 4 is cement powder, resin or a mixture thereof and may additionally include at least one of a pigment and fine aggregates. Although the material may have absorbed some moisture after drying, it is not kneaded with water and is in a state readily amenable to pulverization before charging. On the other hand, the concrete base-course material consists mainly of cement powder, resin or a mixture thereof and may additionally include fine aggregates. In the finished state it is required to differ from the pattern-course material in color, luster, texture and the like, and for this purpose may, if necessary, contain a pigment and either or both of coarse aggregate and fibers selected from among various types of fibers that can be used. The material may be one which has absorbed some moisture after drying but is not kneaded with water and is in a state readily amenable to pulverization before charging. Alternatively, it can be in the form of a concrete slurry obtained by kneading with water. In addition to the aforesaid components, both the pattern-course material and the base-course material may, as found necessary, further have mixed therewith one or more of crushed or pulverized granite, marble, ceramic, slag, minute light-reflecting particles and the like. They may also contain one or more of a congealing and curing promoter, a waterproofing agent, an inflating agent and the like. The aforesaid various kinds of usable fibers include metal fibers, carbon fibers, synthetic fibers, glass fibers and the like. All of the materials to be charged into the cells of the cell form are of a particle size or are formed into a state enabling them to be charged into the cells.

The method for producing a concrete shaped article using the aforesaid pattern-course material and base-course material will now be explained. The cell form 5 can be made of sheet metal, plastic, rubber, wood, paper, non-woven fabric or other such water insoluble material. For enabling its removal from the main form, the cell form 5 is constructed to be open not only at the top but also at the bottom.

For producing the shaped article shown in FIG. 1 a dry red pattern-course material 9R is charged into the cells 5' of the cell form 5 set in the main form as shown in FIG. 5 in the pattern of a circle and a straight line diagonally intersecting the circle, a dry blue pattern material 9B is charged into the cells inside the circle exclusive of the straight line, and a dry or wet base-course material 10 is charged into the cells outward of the circle. All of the materials are charged to the same thickness. They can be charged in any desired order. On completion of material charging, the cell form is removed from the main form. If a dry base-course material was charged, water is then supplied to all portions of the main form interior in such amount as to obtain a prescribed water ratio with respect to the total amount of cement or resin contained in the base-course material 10 and the pattern-course materials 9R and 9B. This water serves to cause the pattern-course materials 9R and 9B and the base-course material 10 to set into an integral shaped article. If a wet base-course material was charged, the same effect is obtained by virtue of the water contained therein without supply of additional water. After the materials have set, the main form 4 is removed.

Figure 6:
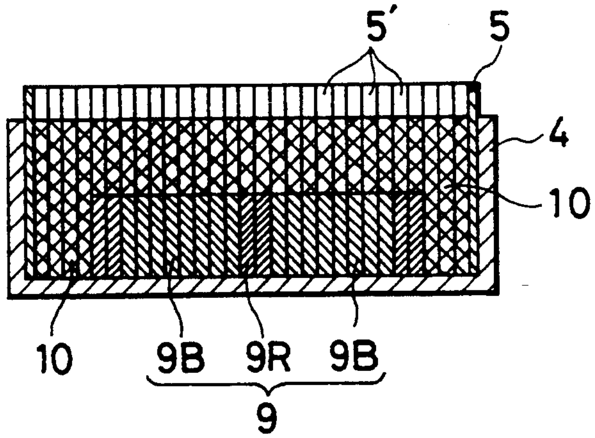
FIG. 6 is a sectional view showing an example of the mode in which the shaped article of FIG. 2 can be produced.
Figure 7:
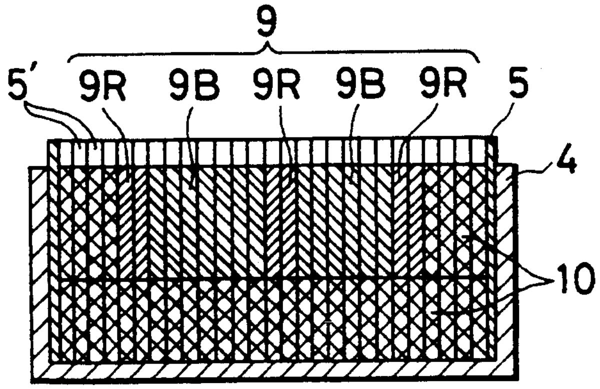
FIG. 7 is a sectional view showing another example of the mode in which the shaped article of FIG. 2 can be produced.

As shown in FIG. 6, for producing the shaped article shown in FIG. 2 dry pattern-course materials 9R and 9B are charged into some of the cells of the cell form 5 within the main form 4 to a thickness that is less than the overall thickness of the shaped article to be produced, whereafter a dry or wet base-course material 10 is charged to a prescribed thickness both in the remaining cells and on top of the pattern-course materials 9R and 9B. The cell form 5 is then removed and, if a dry base-course material was used, water is supplied to all of the materials for causing them to set into an integral shaped article, which is then removed from the main form. If a wet base-course material was used, the same effect is obtained by virtue of the water contained therein without supply of additional water. Alternatively, as shown in FIG. 7, a thin layer of the base-course material 10 is first charged throughout the base form, the pattern-course materials 9R and 9B are then charged to a prescribed thickness into some of cells of the cell form 5, and finally, the base-course material 10 is charged to a prescribed thickness into the remaining cells of the cell form. Then the cell form is removed and all of the materials are caused to set into an integral shaped article by supplying water thereto in the case of using a dry base-course material or, if a wet base-course material was used, by virtue of the water content thereof.

As shown in FIG. 8, for producing the shaped article shown in FIG. 3, a dry white pattern-course material 9W for representing the snow covered peak of a mountain, a dry brown pattern-course material 9Br for representing the side of the mountain, a dry blue pattern-course material 9B for representing the sea, and a dry sky-blue pattern-course material 9S for representing the sky are charged into the corresponding cells of the cell form 5 to a thickness less than that of the final product shaped article to be produced. Next, a dry or wet base-course material 10 is charged throughout the interior of the main form in such amount as to obtain a final shaped article product of the desired thickness. Alternatively, the wet or dry base-course material 10 can first be charged throughout the interior of the main form and the dry pattern-course materials 9W, 9Br, 9B and 9S thereafter be charged into the corresponding cells of the cell form 5. The cell form is then removed from the main form. If a dry base-course material was used, water is supplied in a prescribed amount throughout the form to cause the materials to set into an integral shaped article. If a wet base-course material was used, the same effect is obtained by virtue of the water contained therein without supply of additional water.

The strength of the shaped article obtained by the foregoing process can be enhanced by disposing a reinforcing material in the main form before charging the materials into the main form. Reinforcing material usable for this purpose include metal fibers and filaments, steel rods, lath screen, expandable metal, and various types of ropes and wires.

The cell form 5 has a size conforming to the inside size of the main form 4 in the illustrated embodiment. However, it may have a size slightly larger than the outer configuration of a pattern to be formed. In other words, the size of the cell form does not necessarily conform to the inside size of the main form (FIG. 13).

The pattern-course and base-course materials are charged into the cells manually or by means of an industrial robot and, in order to effect accurate and rapid charging, as shown in FIG. 4(*a*) it is desired to use a mask having the same size as that of the cell form and having an opening corresponding to a pattern to be formed.

To be specific, the pattern of the shaped articles shown in FIGS. 1 and 2 comprises a red portion and a blue portion and, therefore, as shown in FIG. 4(*a*), a mask 11*r* having an opening R corresponding to the red portion and a mask 11*b* having an opening B corresponding to the blue portion are used as shown in FIG. 4. The two masks 11*r* and 11*b* have the same size as that of the cell form 5 and are precisely aligned on the cell form 5 to form a red and blue pattern.

To be specific, the pattern can be formed by placing one of the masks 11*r*, for example, on the surface of the cell form 5, charging a red pattern-course material 9R into the prescribed cells through the opening R of the mask 11*r*, removing the mask 11*r*, then placing the other mask 11*b* on the surface of the cell form 5, charging a blue pattern-course material 9B in the prescribed cells through the opening B of the mask 11*b*, and removing the mask 11*b*. Thus, by the use of the masks the materials can easily be charged rapidly into the cells with exactitude.

In any of the aforesaid production methods, once all of the pattern-course materials have been charged into the prescribed cells, it is possible to remove the cell form 5 from the main form 4 either before or after the base-course material 10 is charged, insofar as the removal of the cell form 5 is carried out at a stage in which it will not degrade the quality of the pattern being formed. In the case of FIG. 5, for example, since the pattern will disintegrate if the cell form is removed immediately after charging of the pattern-course materials 9R, 9B, the removal is conducted after the base-course material 10 has been charged. In the case of FIG. 6, the cell form 5 can be removed after the pattern-course materials 9R and 9B and the base-course material 10 have all been charged to the same thickness or, alternatively, can be removed after the base-course material has been further charged on top of the initially charged materials. In the case of FIG. 7, the cell form is removed after the pattern-course materials 9R and 9B and all of the base-course material 10 have been charged, while in the case of FIG. 8, it can be removed either after all of the pattern-course materials 9S, 9W, 9Br and 9B have been charged or after the base-course material 10 has further been charged on top of these materials. When the cell form is removed, the materials separated by the partition walls of the cell form 5 (which may be pattern-course materials on both sides or pattern-course material on one side and the base-course material on the other) cave into and fill up the spaces left by the removal of the cell form. At the time of removing the cell form, it is preferable to vibrate one or both of the cell form and the main form by use of a vibrator or ultrasonic waves as this regulates the cave-in action of the materials and thus promotes the filling in of the spaces formed by extraction of the cell form partition walls. For the same purpose, during the setting of the materials after removal of the cell form, it is preferable to subject all of them to pressure by means of a press.

As was explained earlier, in the case where a dry base-course material is used, water is appropriately supplied to all portions of the main form interior in such amount as to obtain a prescribed water ratio with respect to the total amount of cement or resin contained in the base-course material and the pattern-course materials. In this connection, it is possible to supply the amount of water for specified regions in advance of other regions so as to better regulate movement between the different material regions. On the other hand, where a wet base-course material is used, since the moistening of the pattern-course materials is realized mainly by virtue of the water content of the base-course material, the water content of the base-course material 10 has to be adjusted in advance in light of the amount of water required both by itself and by the pattern-course materials. Where the water content of the base-course material 10 is insufficient for appropriately moistening the pattern-course materials, additional water can of course be added to these materials.

While it suffices for the depth (height) of the cell form 5 to be equal to the thickness of the pattern-course materials to be charged therein, it is generally more convenient for the cell form 5 to be made high enough to project above the upper surface of the main form 4, as shown in FIGS. 5 to 8, since this makes it easier to remove.

In the foregoing embodiments, the cell form 5 was described as being formed of a material that is not soluble in water. Alternatively, however, it is also possible to use a cell form constituted of wafer or other water soluble material. In this case, the cell form 5 dissolves in place within the main form 4 and, therefore, need not necessarily be open at the bottom. The method of producing a concrete pattern material using a water soluble cell form is substantially the same as that in the aforesaid embodiments using an insoluble cell form, the only difference being that there is no need for removing the cell form from the main form since the cell form is dissolved by the supplied water or the water contained in the material so that the materials that were separated by the partition walls of the cell form 5 (which may be pattern-course materials on both sides or a pattern-course material on one side and the base-course material on the other) cave into and fill up the spaces left by the dissolution of the cell form. For promoting this cave-in action, the materials can be subjected to vibration and/or pressure.

If it is desirable for the cell form to dissolve at an early stage, this can be realized by supplying water to the pattern-course materials immediately after charging of these materials has been completed, and thereafter charging the base-course material. In this case, if a dry base-course material is used, the amount of water supplied thereto after it is charged is made less than it would otherwise be. If a wet base-course material is used, the water content thereof is similarly reduced. If it is desirable to charge a wet base-course material in advance of the pattern-course materials, there is used a cell form made of a water soluble material that takes a relatively long time to dissolve because, otherwise, the cell form is liable to dissolve before the charging of the pattern-course material can be completed.

Since the cell form dissolves within the main form and does not have to be removed, it is preferable to give it a depth (height) equal to the thickness of the pattern-course materials to be charged therein. Specifically, there is no need for it to project above the upper surface of the main form as in the illustrated embodiments.

In any of the aforesaid methods of producing a concrete shaped article, the materials can be charged at higher density and as more finely packed by placing the main form on a table vibrator and subjecting it to vibration during the charging of both the pattern-course materials and the base-course material.

Figure 9:
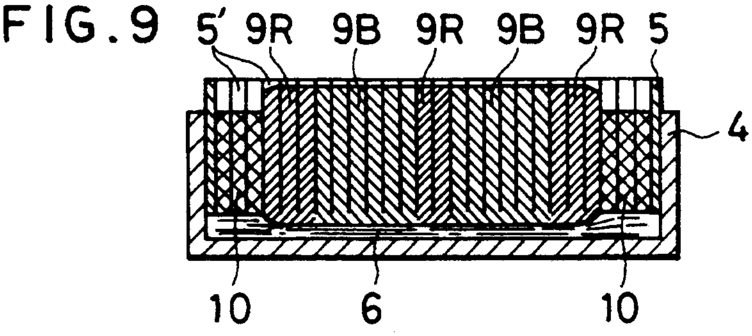
FIG. 9 is a sectional view of the mode in which a shaped article is produced using a main form having a thick mat on the floor thereof.

FIG. 9 shows a case in which a thick, compressible mat 6 of non-woven fabric or the like is laid on the floor of the main form 4 and the cell form 5 is placed on top of the mat 6. An inflating agent is added to one or more of the dry pattern-course materials 9R and 9B to be charged into the cell form 5 and the base-course material 10 to be charged (in the illustrated example, the inflating agent was added to the pattern-course materials 9R and 9B). During setting, the material(s) containing the inflating agent swell and depress the mat 6. As a result, the surfaces of the pattern course and base course of the final shaped article come to rise above the general surface level of shaped article, giving the pattern a three-dimensional appearance. While in the illustrated example the main form 4 is open at the top, a more pronounced three-dimensional effect can be realized by covering the top of the main form 4 with a heavy lid so as to ensure that the swelling of the materials will occur mainly in the direction of the mat 6. Moreover, if a mat 6 made of a water absorbing material is used, the mat will absorb any excess water and work to ensure that the water content of the different materials is maintained uniform, thereby improving the strength properties of the shaped article product.

While the product produced in the manner of FIG. 9 is similar to that of the embodiment of FIG. 5, it is also possible to apply similar techniques to obtain products similar to those produced in the manner of FIGS. 6 to 8 but having patterns with a three-dimensional appearance. In the case of FIG. 7, on the other hand, since the pattern-course materials are charged on top of the previously charged base-course material 10, it is possible to cause the pattern course to rise above the general surface level of the shaped article even without using a thick mat by, for example, mixing an inflating agent into the pattern-course materials. In this case also, the strength properties of the shaped article product can be improved by laying a water absorbing mat on the floor of the main form before the insertion of the cell form.

The invention can be applied not only to the production of a block-like patterned concrete shaped article as described in the foregoing but also to a method for decorating the surface of an existing concrete surface by bonding a patterned concrete shaped article thereto. This method will now be explained.

Figure 12:
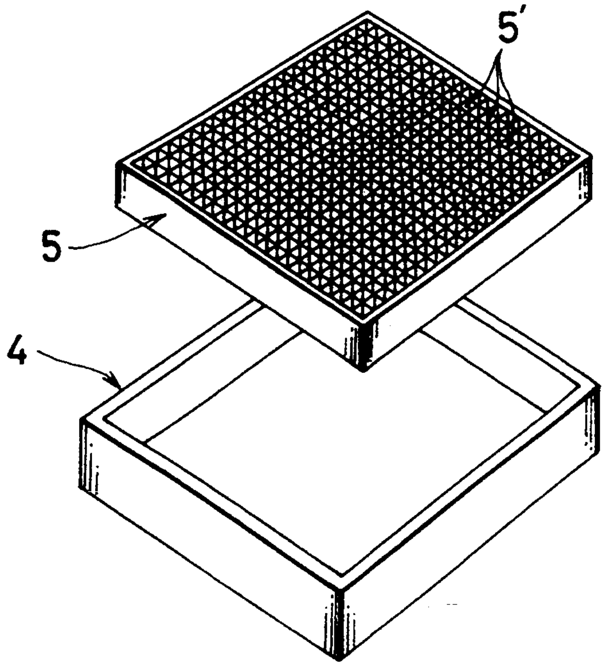
FIG. 12 is a perspective view showing an example of a main form usable for fixing a shaped article produced by the method of the present invention to a concrete surface.

Specifically, as shown in FIG. 12, a frame-like bottomless main form 4 having a cell form 5 disposed therein at a prescribed position is placed on the concrete surface to be decorated. In a manner similar to that in the embodiments described in the foregoing, dry pattern-course concrete material is charged into prescribed cells of the cell form and base-course material is charged into the remaining space within the main form. The cell form is then removed from the concrete surface and, as occasion demands, water is supplied to the materials in such amount as to obtain a prescribed water ratio with respect to the total amount of cement or resin contained in the pattern-course materials and the base-course material. The water contained in the base-course material or the supplied water serves to cause the materials to set and the main form is removed in an appropriate period of time to cause the materials to bond integrally with the concrete surface.

It suffices to remove the cell form from the concrete surface anytime after water has been supplied to the charged materials but before the materials have set. It is, of course, possible to remove both the main form 4 and cell form 5 at the same time. If the cell form 5 is formed of wafer or other such water soluble material, it will be gradually dissolved away by the supplied water, making it unnecessary to remove the same.

In the case where an existing vertical concrete wall surface is to be decorated, a main form having a bottom is used and the pattern-course concrete materials and the base-course concrete material are first charged into a cell form within the main form. An appropriate amount of water is then supplied to the materials, after removal of the cell form if such be necessary, whereafter the materials are pressed against the wall surface, either as charged in the main form or after being removed from the main form, and maintained in this state by appropriate means until the materials have set and bonded integrally with the wall surface.

The removal of the cell form and the main form from the wall surface can alternatively be carried out after water has been supplied to the materials charged into cells but at a stage before the materials have set. It is, of course, possible to remove only the cell form 5. If the cell form 5 is formed of wafer or other such water soluble material, it will be gradually dissolved away by the supplied water, making it unnecessary to remove the same. Aside from the case where the main form 4 is fitted into recesses in the existing wall surface, the bonding of the patterned concrete shaped article to the wall surface has to be conducted by holding the main form 4 in place until the concrete materials have set. This method provides a simple way of decorating cylindrical, wavy and other non-flat surfaces.

Where the shaped article is to be constituted of ceramic material, the dry pattern-course material may, for example, be constituted of one or more of clay, rock particles, rock granules, glass particles and glass granules, with or without a pigment or colorant added thereto. The material may be one which has absorbed some water or been added with a lubricant/bonding agent after drying but it is not kneaded with water or the lubricant/bonding agent and is in a state readily amenable to pulverization. The base-course material may, for example, be constituted of one or more of clay, rock particles, rock granules, glass particles and glass granules, with or without a pigment or colorant added thereto. In the finished state it is required to differ from the pattern-course material in color, luster, texture and the like. The material may be one which has absorbed some moisture or been added with a lubricant/bonding agent after drying but is not kneaded with water or the lubricant/bonding agent and is in a state readily amenable to pulverization before charging. Alternatively, it can be a wet material obtained by kneading with water or lubricant. In addition to the aforesaid components, both the pattern-course material and the base-course material may, as found necessary, further have mixed therewith granular or powdered ceramic material, granular metal or other minerals, and may also contain one or more lubricants, bonding agents and other additives. All the materials to be charged into the cells of the cell form are of a particle size and are formed into a shape enabling them to be readily charged into the cells.

The cell form 5 used in conjunction with the aforesaid pattern-course and base-course materials can be made of metal, plastic, rubber, wood, paper, non-woven fabric or other material not soluble in water or other lubricant/bonding agents and is open not only at the top but also at the bottom so as to enable its removal from the main form.

For producing the raw product for the shaped article shown in FIG. 1 a dry pattern-course material 9R which becomes red upon sintering is charged into the cells of the cell form 5 disposed inside the main form 4 representing a circle portion and a straight line portion diagonally intersecting the circle portion, a dry pattern-course material 9B which becomes blue upon sintering is charged into the cells representing the portion enclosed by the circle and straight line portions, and a dry or wet base-course material 10 is charged into the portion outside of the circle portion. All of the materials are charged to the same thickness. They can be charged in any desired order. On completion of material charging, the cell form is removed from the main form.

In the present embodiment, a ceramic shaped article with a translucent pattern course can be obtained by using pattern-course materials which become translucent upon sintering.

As shown in FIG. 6, for producing the raw product for the shaped article-shown in FIG. 2, dry pattern-course materials 9R and 9B are charged into cells of the cell form 5 to a thickness that is less than the overall thickness of the shaped article, whereafter a base-course material 10 is charged to a prescribed thickness into the remaining cells and on top of the pattern-course materials 9R and 9B. The cell form 5 is then removed. Alternatively, as shown in FIG. 7, a thin layer of the base-course material 10 is first charged throughout the main form, the cell form 5 is disposed at a prescribed position within the main form, the pattern-course materials 9R and 9B are then charged to a prescribed thickness into the prescribed cells of the cell form, and, finally, the base-course material 10 is charged to a prescribed thickness into the remaining cells of the cell form. Then the cell form is removed.

As shown in FIG. 8, for producing the raw product for the shaped article shown in FIG. 3, dry pattern-course material 9W which becomes white upon sintering and is thus appropriate for representing the snow covered peak of a mountain is charged into the corresponding cells of the cell form 5, a dry pattern-course material 9Br which becomes brown upon sintering and is thus suitable for representing the side of the mountain is charged into the corresponding cells, a dry pattern-course material 9B which becomes blue upon sintering and is thus suitable for representing the sea is charged into the corresponding cells, and a dry pattern-course material 9S which becomes sky-blue upon sintering and is thus suitable for representing the sky is charged into the corresponding cells of the cell form 5. These materials are all charged to a thickness less than that of the raw product for the shaped article. Next, a dry or wet base-course material 10 is charged throughout the interior of the main form in such amount as to obtain a raw product of the desired thickness. Alternatively, the base-course material 10 can first be charged throughout the interior of the main form and the dry pattern-course materials 9W, 9Br, 9B and 9S can be thereafter charged into the corresponding cells of the cell form 5. The cell form 5 is then removed from the main form 4.

In any of the aforesaid production methods, once all of the pattern-course materials have been charged, it is possible to remove the cell form from the main form either before or after the base-course material 10 for sintering is charged, insofar as the removal of the cell form is carried out at a stage in which it will not degrade the quality of the pattern being formed. In the case of FIG. 5, for example, since the pattern will disintegrate if the cell form is removed immediately after charging of the pattern-course materials 9R and 9B, the removal is conducted after the base-course material 10 has been charged into the prescribed cells of the cell form. In the case of FIG. 6, the cell form 5 can be removed after the pattern-course materials 9R and 9B and the base-course material 10 have all been charged to the same thickness or, alternatively, can be removed after the base-course material has been further charged on top of the initially charged materials. In the case of FIG. 7, the cell form is removed after the pattern-course materials 9R and 9B and all of the base-course material 10 have been charged, while in the case of FIG. 8, it can be removed either after all of the pattern-course materials 9S, 9W, 9Br and 9B have been charged or after the base-course material 10 has further been charged on top of these materials. When the cell form is removed, the materials separated by the partition walls of the cell form 5 (which may be pattern-course materials on both sides or a pattern-course material on one side and the base-course material on the other) cave into and fill up the spaces left by-the removal of the cell form. At the time of removing the cell form, it is preferable to vibrate one or both of the cell form and the main form by use of a vibrator or ultrasonic waves as this regulates the cave-in action of the materials and thus promotes the filling in of the spaces formed by extraction of the cell form partition walls. For the same purpose, during the setting of the materials after removal of the cell form, it is preferable to subject all of them to pressure by means of a press.

In the case where a dry base-course material is used, water or lubricant/bonding agent is appropriately supplied to all portions of the main form interior in such amount as to obtain a water content or lubricant/bonding agent content as required for press forming of the raw product. For controlling movement among the different materials or other such purposes, the water or lubricant/bonding agent can be supplied to specified regions in advance of other regions.

In the case where a wet base-course material is used, if the water or lubricant/bonding agent content thereof is higher than necessary, the excess water or lubricant/bonding agent is supplied to the dry pattern-course material. Where the water or lubricant/bonding agent content of the base-course material 10 and the pattern material is insufficient, additional water or lubricant/bonding agent can of course be added to these materials.

When the cell form 5 has been removed and the pattern-course material and the base-course material have the water or lubricant/bonding agent content required for pressure forming, the two kinds of materials in the main form are pressed to obtain a raw product for the ceramic shaped article. The raw product is then removed from the main form and heated to the temperature required for sintering it into an integral ceramic shaped article. Before sintering, the water content or lubricant/bonding agent content of the raw product can be adjusted and/or glaze can be applied thereto.

Where a cell form 5 made from wafer or other material soluble in water or lubricant/bonding agent is used, it will be dissolved away. Thus since it does not have to be removed, it need not be open at both the top and bottom but may be closed at the bottom.

The method of producing a ceramic shaped article of the type shown in FIG. 1, 2 or 3 using a cell form made of wafer or other water or solvent soluble material is substantially the same as that in the aforesaid embodiments using an insoluble cell form, the only difference being that there is no need for removing the cell form from the main form since the cell form is dissolved by the water or lubricant/bonding agent contained in the materials so that the materials that were separated by the partition walls of the cell form 5 (which may be pattern-course materials on both sides or a pattern-course material on one side and the base-course material on the other) cave into and fill up the spaces left by the dissolution of the cell form. For promoting this cave-in action, the materials can be subjected to vibration and/or pressure.

If it is desirable for the cell form to dissolve at an early stage, this can be realized by supplying water or lubricant/bonding agent to the pattern-course materials immediately after charging of these materials has been completed, and thereafter charging the base-course material. In this case, if a dry base-course material is used, the amount of water or lubricant/bonding agent supplied thereto after it is charged is made less than it would otherwise be. If a wet base-course material is used, the water or lubricant/bonding agent content thereof is similarly reduced. If it is desirable to charge a wet base-course material in advance of the pattern-course materials, there is used a cell form made of a water or lubricant/bonding agent soluble material that takes a relatively long time to dissolve because, otherwise, the cell form is liable to dissolve before the charging of the shaped article can be completed.

Since the cell form dissolves within the main form and does not have to be removed, it is preferable to give it a depth (height) equal to the thickness of the shaped articles to be charged therein. Specifically, there is no need for it to project above the upper surface of the main form.

The size of the cell form conforms to the inside size of the main form in the illustrated embodiments. However, this is by no means limitative and it may be slightly larger than the size of the pattern to be formed. The pattern-course and main-course materials are charged into the corresponding cells of the cell form manually or by means of an industrial robot. However, accurate and rapid charging can be attained by use of a plurality of masks 11_r_ and 11_b_ having openings at their respective given positions as shown in FIG. 4(_a_), in the same manner as in the previous embodiment. Furthermore, the materials can be charged at higher density and as more finely packed by placing the main form on a table vibrator and subjecting it to vibration during the charging of both the pattern-course materials and the base-course material. FIG. 9 shows a case in which a thick, compressible mat 6 of non-woven fabric or the like is laid on the floor of the main form 4 and the cell form 5 is placed on top of the mat 6. With this arrangement, the mat will absorb any excess water and lubricant/bonding agent and work to ensure that the water and lubricant/bonding agent contents of the different materials are maintained uniform, thereby promoting degassing of the materials during pressing so as to enhance the forming and molding properties of the raw product.

While the raw product produced in the manner of FIG. 9 is similar to that of the embodiment of FIG. 5, it is also possible to apply similar techniques to obtain raw products similar to those produced in the manner of FIGS. 6 to 8. On the other hand, in the case of FIG. 7 in which the pattern-course materials 9B and 9R are charged on top of the previously charged base-course material 10, a water or oil absorbing mat can be laid on the top surface of the raw product or on the floor of the main form. This will ensure that the water and lubricant/bonding agent contents of the different materials are maintained uniform and thus promote degassing of the materials during pressing, which in turn enhances the forming and molding properties of the raw product.

Where the shaped article is to be constituted of artificial stone, the aggregate used as the dry pattern-course material may, for example, be constituted of one or more of gravel, pieces of rock, ceramic, glass, plastic, wood, metal and other such pieces, with or without a pigment. The material may be one which has absorbed some water or been added with a solvent but it is not kneaded with water or the solvent and is in a state readily amenable to pulverization and supply to the cells.

The aggregate used as the base-course material may, for example, be constituted of one or more of gravel, pieces of rock, ceramic, glass, and plastic, with or without a pigment added thereto. In the finished state it is required to differ from the pattern-course material in color, luster, texture and the like.

All the materials to be charged into the cells of the cell form are of a size and are formed into a state enabling them to be readily charged into the cells.

As the material for causing the pattern-course material and the base-course material charged into the cell form to set there can be used a blended combination of cement powder and water, of cement powder, resin and water, or of resin and water or solvent. Moreover, any of these combinations may further include as blended therewith a powder of one or more of rock, ceramic, glass and plastic. If required, the material may further have blended therewith any of various powders, granules or fibers and/or any of various additives, pigments and colorants.

The aforesaid powders and granules include powders and granules of slag, fly ash, fine light-reflecting particles or other such substances. Usable fibers include metal fibers, carbon fibers, synthetic fibers, glass fibers and the like. Usable additives include shrink proofing agents, congealing and setting agents, delaying agents, water proofing agents, inflating agents, water reducing agents, fluidizing agents and the like.

If necessary for enhancing the adherence of the setting material with the pattern-course aggregate and the base-course aggregate, these materials can be sprayed with or immersed in water, solvent or surface treatment agent.

For using the pattern-course aggregate and the base-course aggregate to produce an artificial stone shaped article as shown in FIG. 1, a red pattern-course aggregate 9R is charged into the cells corresponding to the circle portion and a straight line portion diagonally intersecting the circle within the cell form 5 made of the same material as in the previous embodiment, such as metal, plastic, rubber, wood, paper, non-woven fabric, etc., and disposed inside the main form 4, a blue pattern-course aggregate 9B is charged into the cells corresponding the portion enclosed by the circle and straight line portions, and a base-course aggregate 10 is charged into the cells corresponding to the portion outside of the circle portion within the cell form 5. All of the materials are charged to the same thickness. They can be charged in any desired order. On completion of material charging, the cell form is removed from the main form and a setting material is charged into the voids within the respective aggregates for causing them to set into an integral mass. After the materials have set, the integral mass is removed from the main form 4.

As shown in FIG. 6, for producing the block shown in FIG. 2, pattern-course aggregates 9R and 9B are charged into the cells of the cell form 5 to a thickness that is less than the overall thickness of the product block, whereafter a base-course aggregate 10 is charged to a prescribed thickness both in the remaining cells of the cell form 5 and on top of the pattern-course aggregates 9R and 9B. The cell form 5 is then removed and a setting material is charged into the voids within the respective aggregates for causing them to set into an integral shaped article. Alternatively, as shown in FIG. 7, a thin layer of the base-course aggregate 10 is first charged throughout the main form, the cell form is disposed at a prescribed position within the main form, the pattern-course aggregates 9R and 9B are then charged to a prescribed thickness into the cells of the cell form, and finally, the base-course aggregate 10 is charged to a prescribed thickness into the cells of the cell form. Then the cell form is removed and a setting material is charged into the voids within the respective aggregates for causing them to set into an integral shaped article.

As shown in FIG. 8, for producing the shaped article shown in FIG. 3, white pattern-course aggregate 9W for representing the snow covered peak of a mountain is charged into the corresponding cells of the cell form 5, a brown pattern-course aggregate 9Br for representing the side of the mountain is charged into the corresponding cells, a blue pattern-course aggregate 9B for representing the sea is charged into the corresponding cells, and a sky-blue pattern-course aggregate 9S for representing the sky is charged into the corresponding cells of the cell form 5. These aggregates are all charged to a thickness less than that of the final product shaped article to be produced. Next, a base-course aggregate 10 is charged throughout the interior of the main form in such amount as to obtain a final shaped article product of the desired thickness. Alternatively, the base-course aggregate 10 can first be charged throughout the interior of the main form and the pattern-course aggregates 9W, 9Br, 9B and 9S thereafter be charged into the corresponding cells within the cell form 5. The cell form is then removed from the main form and a setting material is charged into the voids within the respective aggregates for causing them to set into an integral shaped article.

In any of the aforesaid production methods, once all of the pattern-course aggregates have been charged, it is possible to remove the cell form from the main form either before or after the base-course aggregate 10 is charged, insofar as the removal of the cell form is carried out at a stage in which it will not degrade the quality of the pattern being formed. In the case of FIG. 5, for example, since the pattern will disintegrate if the cell form is removed immediately after charging of the pattern-course aggregates 9R and 9B, the removal is conducted after the base-course aggregate 10 has been charged into cells of the cell form. In the case of FIG. 6, the cell form 5 can be removed after the pattern-course aggregates 9R and 9B and the base-course aggregate 10 have all been charged to the same thickness or, alternatively, can be removed after the base-course aggregate 10 has been further charged on top of the initially charged aggregates. In the case of FIG. 7, the cell form is removed after the pattern-course aggregates 9R and 9B and all of the base-course aggregate 10 have been charged, while in the case of FIG. 8, it can be removed either after all of the pattern-course aggregates 9S, 9W, 9Br and 9B have been charged or after the base-course aggregate 10 has further been charged on top of these aggregates. When the cell form is removed, the aggregates separated by the partition walls of the cell form 5 (which may be pattern-course aggregates on both sides or a pattern-course aggregate on one side and the base-course aggregate on the other) cave into and fill up the spaces left by the removal of the cell form. The materials can be charged into the cells 5' of the cell form 5 with ease by using masks **11*r* and 11*b* having openings R and B respectively at their prescribed positions as shown in FIG. 4(*a*)**. At the time of removing the cell form, it is preferable to vibrate one or both of the cell form and the main form by use of a vibrator or ultrasonic waves as this regulates the cave-in action of the aggregates and thus promotes the filling in of the spaces formed by extraction of the cell form partition walls. For the same purpose, during the setting of the aggregates after removal of the cell form, it is preferable to subject all of them to pressure by means of a press.

The charging of the setting material throughout the voids of the aggregates can be carried out by vacuum charging. Further, it is possible to supply the amount of setting material for specified regions in advance of other regions so as to better regulate movement between the different material regions. Also, depending on the fluidity of the setting material, it is possible to use a base-course aggregate that has been charged with the setting material in advance. While it suffices for the depth (height) of the cell form 5 to be equal to the thickness of the pattern-course aggregates to be charged therein, it is generally more convenient for the cell form 5 to be made high enough to project above the upper surface of the main form 4, as shown in the drawings, since this makes it easier to remove.

In the method of producing a shaped artificial stone article set out above, the cell form was described as being formed of an insoluble material. Alternatively, however, it is also possible to use a cell form constituted of wafer or other water or solvent soluble material. In this case, the cell form is dissolved by the setting material and, therefore, may be closed at the bottom.

Since the cell form dissolves after the pattern-course and base-course aggregates have been charged into it, it does not have to be removed. Aside from this difference, the method of producing a shaped article using an insoluble cell form is substantially the same as that in the aforesaid embodiment using an insoluble cell form. When the cell form dissolves, the aggregates that were separated by the partition walls of the cell form (which may be pattern-course aggregates on both sides or a pattern-course aggregate on one side and the base-course aggregate on the other) cave into and fill up the spaces left by the dissolution of the cell form. For promoting this cave-in action, the materials can be subjected to vibration and/or pressure.

If it is desirable for the cell form to dissolve at an early stage, this can be realized by supplying setting material to the pattern-course aggregates immediately after charging of these aggregates has been completed, and thereafter charging the base-course aggregate. In this case, the amount of setting material subsequently charged is reduced. If it is desirable to charge base-course aggregate precharged with setting material in advance of the pattern-course aggregates, there is used a cell form made of a soluble material that takes a relatively long time to dissolve because, otherwise, the cell form is liable to dissolve before the charging of the pattern-course aggregates can be completed.

Since the cell form dissolves within the main form and does not have to be removed, it is preferable to give it a depth (height) equal to the thickness of the pattern-course materials to be charged therein. Specifically, there is no need for it to project above the upper surface of the main form.

The size of the cell form conforms to the inside size of the main form in the illustrated embodiments. However, this is by no means limitative and it may be slightly larger than the size of the pattern to be formed. The pattern-course and main-course materials are charged into the corresponding cells of the cell form manually or by means of an industrial robot. However, accurate and rapid charging can be attained by use of a plurality of masks **11*r* and 11*b* having openings at their respective given positions as shown in FIG. 4(*a*)**, in the same manner as in the previous embodiment.

In the aforesaid method of producing an artificial stone shaped article, the aggregates can be charged at higher density and as more finely packed by placing the main form on a table vibrator and subjecting it to vibration during the charging of both the pattern-course aggregates and the base-course aggregate. FIG. 9 shows a case in which a thick, compressible mat 6 of non-woven fabric or the like is laid on the floor of the main form 4 and the cell form 5 is placed on top of the mat 6. An inflating agent is added to one or more of the dry pattern-course aggregates 9R and 9B to be charged into the cell form 5 and the base-course aggregate 10 (in the illustrated example, the inflating agent was added to the pattern-course aggregates 9R and 9B). During setting, the aggregate(s) containing the inflating agent swell and depress the mat 6. As a result, the surfaces of the pattern course and base course of the final shaped article come to rise above the general surface level of shaped article, giving the pattern a three-dimensional appearance. While in the illustrated example the main form 4 is open at the top, a more pronounced three-dimensional effect can be realized by covering the top of the main form 4 with a heavy lid so as to ensure that the swelling of the materials will occur mainly in the direction of the mat 6. Moreover, if a mat 6 made of a water or oil absorbing material is used, the mat will absorb any excess water or solvent and work to ensure that the water content of the different materials is maintained uniform, thereby improving the strength properties of the shaped article product.

While the artificial stone shaped article produced in the manner of FIG. 9 is similar to that of the embodiment of FIG. 5, it is also possible to obtain shaped articles given a three-dimensional appearance in the embodiments of FIGS. 6 to 8. In the case of FIG. 7, on the other hand, since the pattern-course aggregates 9R and 9B are charged on top of the previously charged base-course aggregate 10, it is possible to cause the pattern course to rise above the general surface level of the shaped article even without using a thick mat by, for example, mixing an inflating agent into the setting material to be charged into the voids in the pattern-course aggregates. In this case also, the strength properties of the shaped article product can be improved by laying a water or oil absorbing mat on the floor of the main form before the insertion of the cell form.

Figure 10:
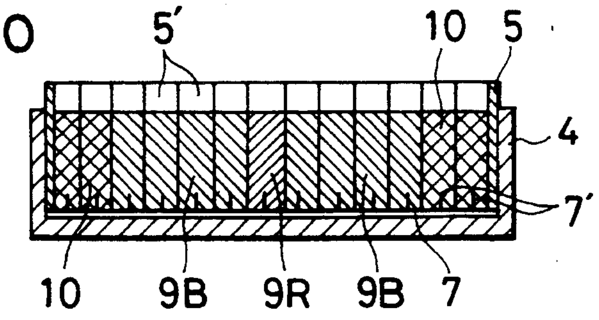
FIG. 10 is a sectional view showing the mode in which a shaped article is produced using a main form having a sheet formed with upright pins on the floor thereof.
Figure 11:
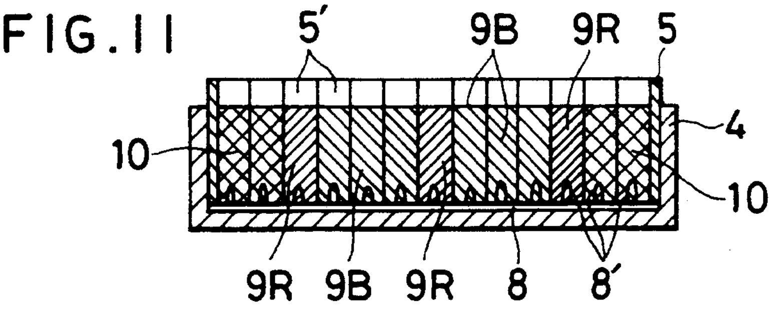
FIG. 11 is a sectional view showing the mode in which a shaped article can be produced using a main form having a sheet formed with hairs on the floor thereof.

In any of the above individually explained methods for producing a concrete shaped article, a ceramic shaped article or an artificial stone shaped article, it is, as illustrated in FIGS. 10 and 11, advantageous to lay on the floor of the main form 4 a plate or sheet 7 having pins or projections 7' or a sheet 8 having implanted, raised or attached hairs, pile or loops 8' and to place the cell form 5 on top of this plate or sheet. Then when the pattern-course materials 9R and 9B and the base-course material 10 are charged into the respective cells, they will be held in place by the pins or projections 7' or the hairs, pile or loops 8'. As a result, they will be prevented from shifting under the effect of vibration or the like until they have completely set, thus ensuring sharp boundaries between the different pattern-course materials and between the pattern-course materials 9R and 9B and the base-course material 10.

The need for removing the sheet or plate having the pins, projections, hairs, pile or loops can be eliminated by forming the entire sheet or plate including the members projecting therefrom of a soluble material that will dissolve by the time that the different materials have set. Whether to use a soluble or an insoluble sheet or plate is decided in light of the degree to which the materials have to be retained.

A method for using a main form constituted of a deformable material for producing patterned shaped articles of other than block-like configuration will now be explained with reference to FIGS. 14 to 23.

Figure 14:
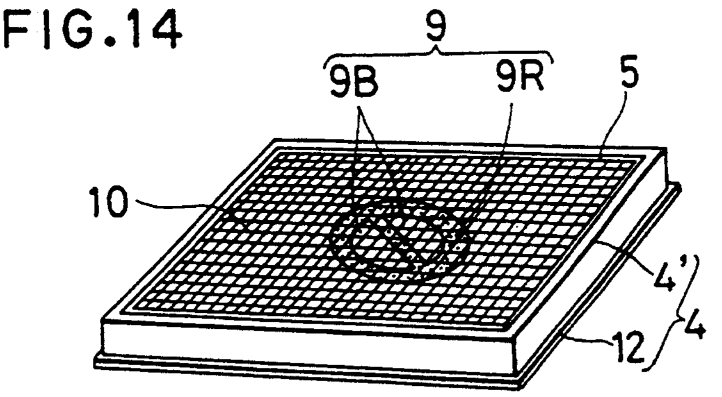
FIG. 14 is a perspective view of a main form for producing a cylindrical shaped article according to the method of this invention, shown in the state charged with the pattern-course material and the base-course material.
Figure 15:
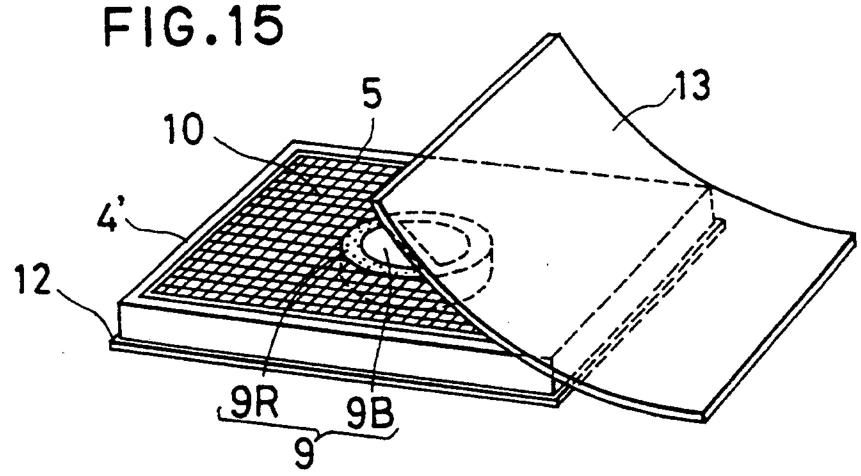
FIG. 15 is a perspective view showing the material charged into the main form of FIG. 14 after it has set.
Figure 16:
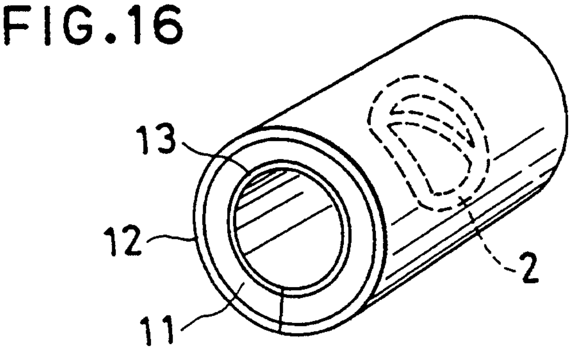
FIG. 16 is a perspective view of a cylindrical shaped article formed by rolling up congealed materials of FIG. 15 together with the main form.

FIGS. 14 to 16 illustrate an embodiment for producing a cylindrical shaped article. A peripheral frame 4' of the main form 4 is constituted of a deformable material, such as natural rubber, synthetic rubber, plastic or the like, and a coilable bottom sheet 12 of the main form 4 is made of sheet metal, plastic, paper, non-woven fabric, knit fabric or woven fabric, rubber sheet or the like. The peripheral frame 4' is set on the bottom sheet 12 and a deformable cell form 5 which will be described in detail later is disposed at a prescribed position within the area surrounded by the peripheral frame 4'. Dry pattern-course materials 9R and 9B and a base-course material 10 are charged into prescribed cells of the cell form 5 (FIG. 14). After the two types of material have been brought to a deformable state owing to their congelation etc., the area within the peripheral frame 4' is covered with a coilable auxiliary sheet 13 similar to the bottom sheet 12 (FIG. 15). The two types of material within the area surrounded by the peripheral frame 4' are coiled (rolled up) together with the peripheral frame 4', as sandwiched between the bottom sheet 12 and the auxiliary sheet 13 (FIG. 16). The two types of material are maintained in the rolled-up state until they set, whereby there is obtained a cylindrical shaped article having a pattern course 2 exposed at a desired position thereof. (Where ceramic materials are used, there is obtained a raw product which is thereafter sintered into the final patterned shaped article.)

Figure 17:
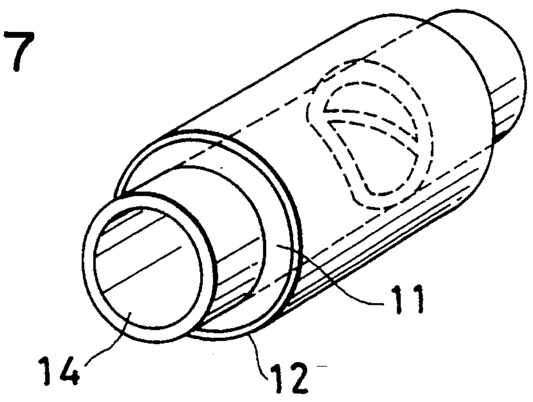
FIG. 17 is a perspective view of a cylindrical shaped article produced according to another embodiment of the method of this invention.
Figure 18:
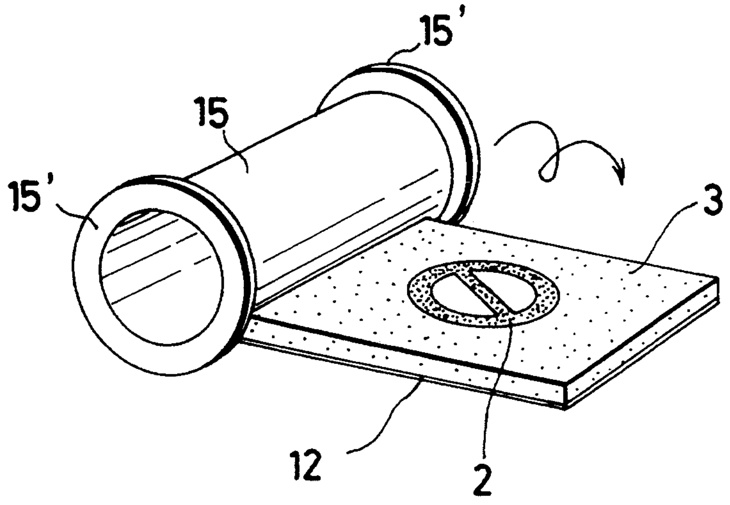
FIG. 18 is a perspective view of a cylindrical shaped article produced according to another embodiment of the method of this invention.

In the example shown in FIG. 17, the pattern-course materials and the base-course material are charged in the same way as in the case of FIG. 14. After they have been brought to a deformable state owing to their congelation etc., they are wrapped around a die 14 matched to the internal shape of the cylindrical shaped article to be produced (cylindrical in the case of a cylindrical shaped article product) and are held wrapped therearound until they have set into a cylindrical shaped article. In this case, since the surfaces of the pattern-course materials 9R and 9B and the base-course material 10 exposed on the upper side within the peripheral frame 4' are held in contact with the outer surface of the die 14, the auxiliary sheet 13 can be omitted. Use of a polygonal die 14 makes it possible to produce a cylindrical shaped article having a polygonal sectional configuration.

In the wrapping or coiling method illustrated in FIGS. 16 and 17, when the opposite ends of the peripheral frame 4' come into contact, a seam occurs between the opposite edges of the base-course material. One way of coping with this problem is to slightly overlap the opposite ends of the peripheral frame 4' so as to form a double layer of the base-course material at the seam. Another is to cut away the opposite ends of the peripheral frame 4' so that the thus opposite exposed edges of the base-course material can be brought into abutment for preventing the formation of a space at the seam.

Figure 19:
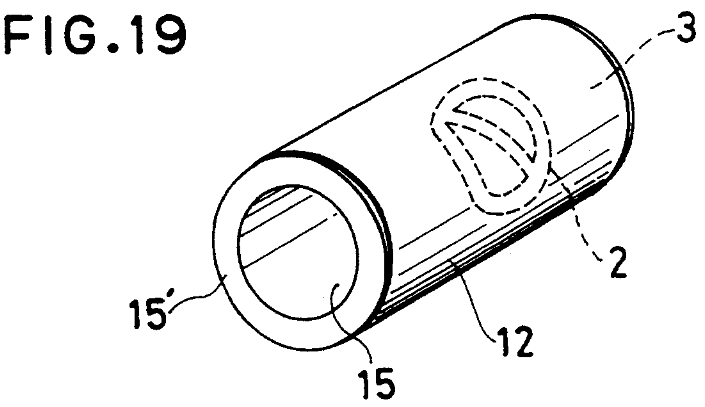
FIG. 19 is a perspective view of a cylindrical shaped article produced according to the method of FIG. 18.

In a similar manner, it is further possible to produce a cylindrical shaped article by charging the pattern-course materials 9R and 9B and the base-course material 10 into the main form 4 in the manner of FIG. 14, removing the peripheral frame 4' after the charged materials have been brought to a deformable state owing to their congelation etc., wrapping them together with the bottom sheet 12 onto a die 15 matched to the internal shape of the cylindrical shaped article to be produced and having a flange 15' at either end, and maintaining the two types of material in the rolled-up condition until they set (FIG. 19). As in the case of FIG. 17, the inside length of the peripheral frame 4' is of course made the same as the outer circumference of the die 15 and the width thereof is made equal to the distance between the flanges 15'. It is again possible to omit use of the auxiliary sheet 13 and possible to produce a cylindrical shaped article having a polygonal sectional configuration by using a polygonal die 15.

While the foregoing description relates to the production of a cylindrical shaped article, it is also possible by partially or totally deforming the main form to produce shaped articles of other than cylindrical configuration.

Figure 20:
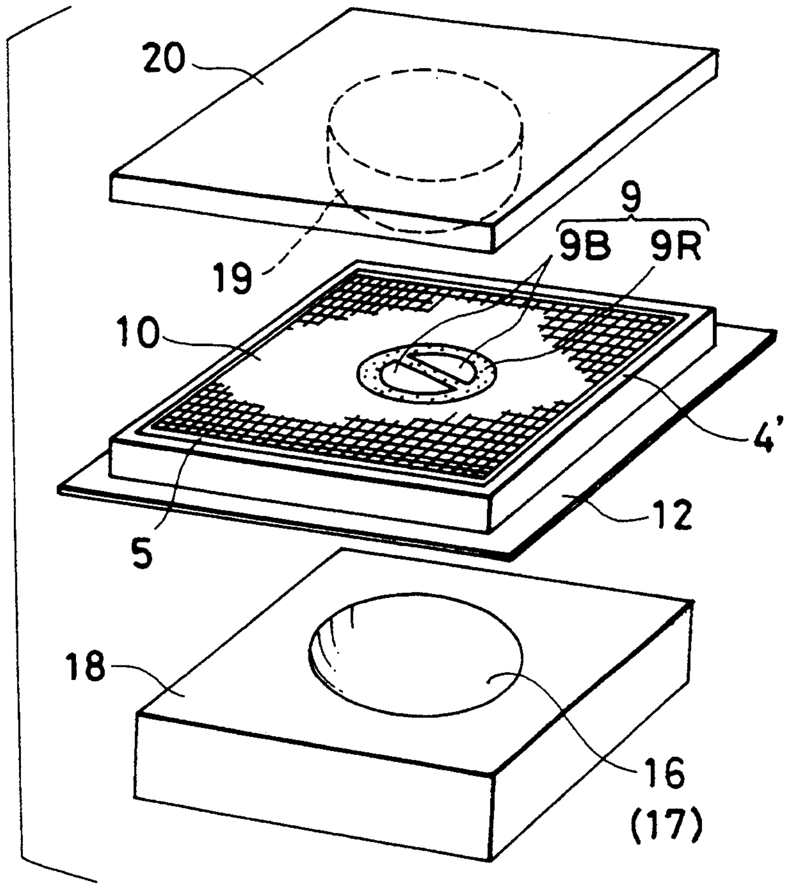
FIG. 20 is an exploded perspective view of a method according to the invention for producing a shaped article with a downwardly bulged profile.
Figure 21:
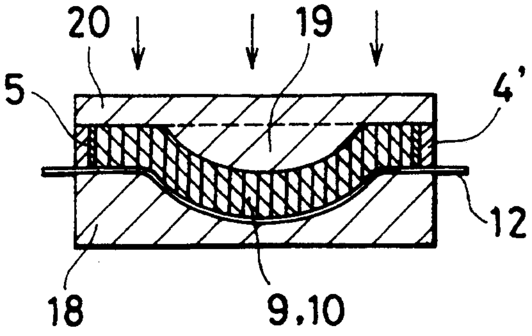
FIG. 21 is a sectional view showing the mode in which the shaped article of FIG. 20 is produced.

For example, a shaped article with a downwardly bulged configuration can be produced by charging the pattern-course materials 9R and 9B and the base-course material 10 into the main form 4 in the manner of FIG. 14, placing the result on a lower die 18 whose upper surface is formed with a recess 16 filled with gel 17, as shown in FIG. 20, pressing it from above with an upper die 20 having a protuberance 19 complementary to the recess 16 (FIG. 21), thus causing its upper surface to be depressed by the protuberance 19 and its lower surface to be pushed into the recess 16. In this case, since the only part of the bottom sheet 12 is deformed, the peripheral frame 4' need not be deformable. The purpose of the gel 17 in the recess 16 is to hold the portion of the bottom sheet 12 positioned over the recess 16 flat up to the time that pressure is applied by the upper die 20. With the start of pressure application by the upper die 20, the gel is caused to overflow from around the upper edge of the recess 16 as a result of the intrusion into the recess 16 of the bottom sheet and the material resting thereon. Alternatively, the lower die 18 can be formed of clay or other plastic material. In this case, since the plastic lower die will be depressed by the pressure of the upper die so as to form the recess 16, there is no need to use the gel 17.

Figure 22:
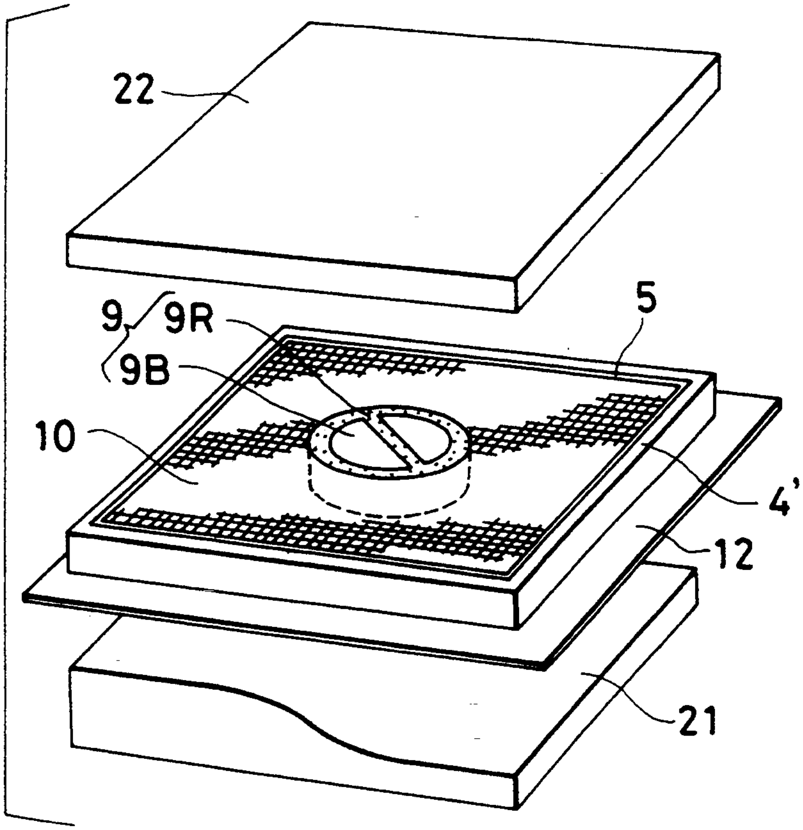
FIG. 22 is an exploded perspective view of a method according to the invention for producing a roof tile-like shaped article.
Figure 23:
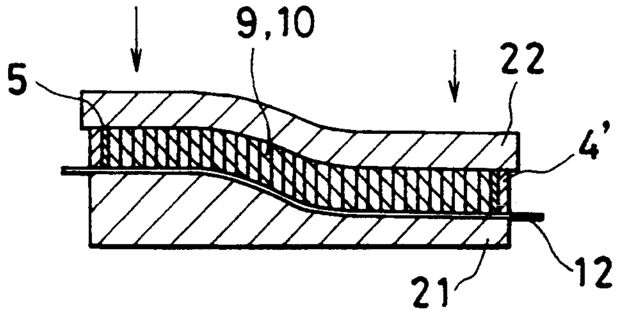
FIG. 23 is a sectional view showing the mode in which the shaped article of FIG. 22 is produced.

Further, a roof tile-like shaped article can be produced by charging the pattern-course materials 9R and 9B and the base-course material 10 into the main form in the manner of FIG. 14, placing the result on a lower die 21 having a rising-and-falling upper surface, as shown in FIG. 22, pressing it from above with a flat elastic plate 22 (FIG. 23), thus causing the main form 4 and both types of materials contained therein to be deformed in accordance with the contour of the lower die 21. In this case, while it is possible to constitute the main form 4 of a peripheral frame 4' and a bottom sheet 12 laid on the bottom thereof, it is also possible to use a main form 4 that is made closed at the bottom by providing the peripheral frame 4' with a deformable floor.

In production involving deformation of part or all of the main form in the aforesaid manner, if the cell form is deformable, it can, even if insoluble, be removed after deformation of the main form. If, however, the cell form is both insoluble and incapable of deformation, it has to be removed prior to deformation of the main form. On the other hand, if the cell form is water soluble, it suffices to deform the main form after dissolution of the cell form has begun.

Further, it is possible to use a press to apply pressure to the pattern-course material(s) and base-course material while they are setting in the main form and also to use a vibrator or ultrasonic waves to vibrate either or both of the main form and cell form during material charging or product removal.

A deformable cell form can be obtained by constituting it of a flexible material such as rubber, plastic or the like material or by forming cuts in the partitioning walls defining the cells from either or both of above and below.

In each of the embodiments shown in FIGS. 5 to 8, the size of the cell form conforms to the inside size of the main form. When a pattern to be formed is small, however, a shaped article can be produced by disposing a small-sized cell form at a prescribed position within the main form as shown in FIG. 13, charging a pattern-course material into the prescribed cells of the cell form, and charging a base-course material into the remaining space within the main form.

Use of a water-absorbing or oil-absorbing mat such as shown in FIG. 9 is advantageous in that the mat absorbs excess water, lubricant/bonding agent and solvent from portions containing an excess amount of these and supplies them to portions which are deficient in them, thus ensuring uniform water, lubricant/bonding agent and solvent content throughout the shaped article and also reducing the surface water (solvent)-to-cement (resin) ratio so as to promote degassing at the time of pressing. The result is a product of better performance.

As explained in the foregoing, the invention makes it possible to easily produce a patterned concrete shaped article, a patterned ceramic shaped article or a patterned artificial stone shaped article with a pattern course that is exposed over part or the whole of its surface. Since the pattern is formed to a substantial depth below the surface of the shaped article, it does not wear off or become unsightly even when material is removed from the surface of the shaped article by abrasion. The invention further makes it possible to produce a thick shaped article and then slice it into a number of thin shaped articles having the same pattern.

As the pattern course is formed by charging dry pattern-course material into the cells of the cell form disposed within the main form, the materials can be densely charged without leaving undesirable voids. Moreover, the pattern-course and base-course materials cave into and fill up the spaces left by removal or dissolution of the cell form, so that the boundaries between the pattern course and the base course are clear-cut and the pattern as a whole is very sharply defined. On the other hand, it is also possible to positively disturb the materials either at the boundaries between them or as a whole (as by stirring) after the pattern-course material and the base-course material have been charged into the cell form and then the cell form has been removed. Doing this enables the production of shaped articles which resemble marble and other kinds of natural stone. Further, by appropriately selecting the grain size and charging ratio of each charged pattern-course material it is possible to obtain a porous and water permeable pattern course, by appropriately selecting the grain size and charging ratio of each charged base-course material it is possible to obtain a porous and water permeable base-course, and by appropriately selecting the grain size and charging ratio of both types of materials it is possible to obtain a porous and water permeable shaped article.

Moreover, if a pattern-course material should inadvertently be charged at the wrong location, the mistake can easily be remedied since the pattern-course material is dry at the time of being charged into the cell form and can thus be sucked up and removed by means of a vacuum cleaner type apparatus.

What is claimed is:

1. A method for producing a patterned concrete shaped article, comprising the steps of:

laying a mat on an inside bottom surface of a main form for molding said shaped article;

disposing on said mat at a prescribed position a cell form comprising a plurality of cylindrical cells which have an equal height and are arranged in a contiguous manner;

charging a prescribed amount of dry concrete material for forming a pattern-course of said shaped article into a prescribed number of cells of said cell form conforming to a shape of a pattern to be formed;

charging a prescribed amount of concrete material for forming a base-course of said shaped article into a remaining space within said main form;

removing said cell form from said main form;

causing said dry pattern-course concrete material and said base-course concrete material to set within said main form into said shaped article with water or with water under a pressure application, wherein said mat laid on said inside bottom surface of said main form permits an absorption excess water and a supply of said excess water to a portion of said dry pattern-course material and said base-course material which lack moisture, and a degassing of said dry pattern-course material and said base course material under said pressure application; and removing said shaped article from said main form.

2. A method according to claim 1, wherein said dry pattern-course concrete material is at least one member selected from the group consisting of cement powder and resin, and said base-course concrete material is a mixture of at least one member selected from the group consisting of cement powder, resin and a fine aggregate.

3. A method according to claim 1, wherein said dry pattern-course concrete material is a mixture of at least one member selected from the group consisting of cement powder and resin with at least one member selected from the group consisting of a pigment and a fine aggregate, and said base-course concrete material is a mixture of at least one member selected from the group consisting of cement powder, resin and a fine aggregate.

4. A method according to claim 1, wherein said cylindrical cells constituting said cell form have an equal size of square sectional profile, each side of said cylindrical cells having a length of 1.0 to 5.0 mm.

5. A method according to claim 1, wherein said cylindrical cells constituting said cell form have an equal size of honeycomb sectional profile, each side of said cylindrical cells having a length of 0.5 to 3.0 mm.

6. A method according to claim 1, wherein said water is supplied into said main form.

7. A method according to claim 1, wherein said water is contained in said base-course concrete material.

8. A method according to claim 1, wherein said mat is a water absorbing mat.

9. A method according to claim 1, wherein said mat is a water and air-permeable mat.

10. A method according to claim 1, wherein said mat is made of non-woven fabric.

11. A method according to claim 9, wherein said water and air-permeable mat is made of non-woven fabric.

12. A method according to claim 1, wherein said dry pattern-course concrete material and said base-course concrete material are charged at their respective prescribed positions using masks each having an opening conforming to a shape of a corresponding pattern to be formed.

13. A method according to claim 1, wherein each of said dry pattern-course concrete material and said base-course concrete material contains an inflating agent.

14. A method according to claim 1, further comprising the step of disturbing at least part of said pattern-course material and base-course material after said step of removing said cell form from said main form.

15. A method according to claim 1, wherein said pattern-course material and said base-course material are supplied in their respective amounts capable of making said shaped article water-permeable.

16. A method according to claim 1, further comprising the step of fixing said concrete shaped article onto a surface of an existing concrete substrate.

17. A method according to claim 1, wherein at least one of said main form and said cell form is made of a deformable material and further comprising the step of deforming said at least one form having said pattern-course material and said base-course material accommodated therein before said step of causing said pattern-course material and said base-course material to set.

18. A method according to claim 17, wherein said deformable material is one member selected from the group consisting of rubber, synthetic rubber and plastic.

19. A method for producing a patterned concrete shaped article, comprising the steps of:

laying a mat on an inside bottom surface of a main form for molding said shaped article;

disposing on said mat at a prescribed position a water soluble cell form comprising a plurality of cylindrical cells which have an equal height and are arranged in a contiguous manner;

charging a prescribed amount of dry concrete material for forming a pattern-course of said shaped article into a prescribed number of cells of said water soluble cell form conforming to a shape of a pattern to be formed;

charging a prescribed amount of concrete material for forming a base-course of said shaped article into a remaining space within said main form;

causing said water soluble cell form to dissolve and said dry pattern-course concrete material and said base-course concrete material to set within said main form into said shaped article with water or with water under a pressure application, wherein said mat laid on said inside bottom surface of said main form permits an absorption of excess water and a supply of said excess water to a portion of said dry pattern-course concrete material and said base-course concrete material which lack moisture, and a degassing of said dry pattern-course concrete material and said base-course concrete material under said pressure application; and removing said shaped article from said main form.

20. A method according to claim 19, wherein said water is supplied into said main form.

21. A method according to claim 19, wherein said water is contained in said base-course concrete material.

22. A method for producing a patterned artificial stone shaped article, comprising the steps of:

laying a mat on an inside bottom surface of a main form for molding said shaped article;

disposing on said mat at a prescribed position a cell form comprising a plurality of cylindrical cells which have an equal height and are arranged in a contiguous manner;

charging a prescribed amount of dry aggregate which is an artificial stone material for forming a pattern-course of said shaped article into a prescribed number of cells of said cell form conforming to a shape of a pattern to be formed;

charging a prescribed amount of aggregate which is an artificial stone material for forming a base-course of said shaped article into a remaining space within said main form;

removing said cell form from said main form;

charging a setting agent into spaces between said dry pattern-course aggregate and said base-course aggregate to cause said aggregate to set within said main form into said shaped article with said setting agent or with said setting agent under a pressure application, wherein said mat laid on said inside bottom surface of said main form permits an absorption of excess setting agent and a supply of said excess setting agent to a portion of said artificial stone materials which lack setting agent, and a degassing of said artificial stone materials under said pressure application; and removing said shaped article from said main form.

23. A method according to claim 22, wherein said cylindrical cells constituting said cell form have an equal size of square sectional profile, each side of said cylindrical cells having a length of 1.0 to 5.0 mm.

24. A method according to claim 22, wherein said cylindrical cells constituting said cell form have an equal size of honeycomb sectional profile, each side of said cylindrical cells having a length of 0.5 to 3.0 mm.

25. A method according to claim 22, wherein said dry pattern-course aggregate and said base-course aggregate are charged at their respective prescribed positions using masks each having an opening conforming to a shape of a corresponding pattern to be formed.

26. A method according to claim 22, further comprising the step of disturbing at least part of said pattern-course aggregate and base-course aggregate after said step of removing said cell form from said main form.

27. A method according to claim 22, wherein at least one of said main form and said cell form is made of a deformable material and further comprising the step of deforming said at least one form having said pattern-course material and said base-course material accommodated therein before said step of causing said pattern-course material and said base-course material to set.

28. A method according to claim 27, wherein said deformable material is one member selected from the group consisting of rubber, synthetic rubber and plastic.

29. A method for producing a patterned artificial stone shaped article, comprising the steps of:

laying a mat on an inside bottom surface of a main form for molding said shaped article;

disposing on said mat at a prescribed position a soluble cell form comprising a plurality of cylindrical cells which have an equal height and are arranged in a contiguous manner;

charging a prescribed amount of dry aggregate which is an artificial stone material for forming a pattern-course of said shaped article into a prescribed number of cells of said soluble cell form conforming to a shape of a pattern to be formed;

charging a prescribed amount of aggregate which is an artificial stone material for forming a base-course of said shaped article into a remaining space within said main form;

charging a setting agent containing water or solvent into spaces between said dry pattern-course aggregate and said base-course aggregate to cause said soluble cell form to dissolve and said dry pattern-course aggregate and said base-course aggregate to set within said main form into said shaped article with said water or solvent or with said setting agent under a pressure application, wherein said mat laid on said inside bottom surface of said main form permits an absorption of excess setting agent and a supply of said excess setting agent to a portion of said aggregates which lack setting agent, and a degassing of said aggregates under said pressure application; and removing said shaped article from said main form.

30. A method for producing a patterned ceramic shaped article, comprising the steps of:

laying a mat on an inside bottom surface of a main form for molding said shaped article;

disposing on said mat at a prescribed position a cell form comprising a plurality of cylindrical cells which have an equal height and are arranged in a contiguous manner;

charging a prescribed amount of dry ceramic material for forming a pattern-course of said shaped article into a prescribed number of cells of said cell form conforming to a shape of a pattern to be formed;

charging a prescribed amount of ceramic material for forming a base-course of said shaped article into a remaining space within said main form;

removing said cell form from said main form;

charging at least one of water and lubricant-bonding agent into said main form to cause said pattern-course material and said base-course material to set under pressure within said main form into said shaped article with said at least one of water and lubricant-bonding agent, wherein said mat laid on said inside bottom surface of said main form permits an absorption of excess water or excess lubricant-bonding agent and a supply of said excess water or said excess lubricant-bonding agent to a portion of said ceramic materials which lack water or lubricant-bonding agent, and a degassing of said ceramic materials under said pressure;

removing said shaped article from said main form; and sintering said shaped article.

31. A method according to claim 30, wherein said dry pattern-course ceramic material is at least one member selected from the group consisting of clay, particles of rock, granules of rock, particles of glass, granules of glass and glaze particles, and said base-course ceramic material is at least one member selected from the group consisting of clay, particles of rock, granules of rock, particles of glass and granules of glass.

32. A method according to claim 30, wherein said dry pattern-course ceramic material is a mixture of at least one member selected from the group consisting of clay, particles of rock, granules of rock, particles of glass, granules of glass and glaze particles with at least one member selected from the group consisting of a pigment and a colorant, and said base-course ceramic material is at least one member selected from the group consisting of clay, particles of rock, granules of rock, particles of glass and granules of glass.

33. A method according to claim 30, wherein said dry pattern-course ceramic material is at least one member selected from the group consisting of clay, particles of rock, granules of rock, particles of glass, granules of glass and glaze particles, and said base-course ceramic material is a mixture of at least one member selected from the group consisting of clay, particles of rock, granules of rock, particles of glass and granules of glass with at least one member selected from the group consisting of a pigment and a colorant.

34. A method according to claim 30, wherein said dry pattern-course ceramic material is a mixture of at least one member selected from the group consisting of clay, particles of rock, granules of rock, particles of glass, granules of glass and glaze particles with at least one member selected from the group consisting of a pigment and a colorant, and said base-course ceramic material is a mixture of at least one member selected from the group consisting of clay, particles of rock, granules of rock, particles of glass and granules of glass with at least one member selected from the group consisting of a pigment and a colorant.

35. A method according to claim 30, wherein said cylindrical cells constituting said cell form have an equal size of square sectional profile, each side of said cylindrical cells having a length of 1.0 to 5.0 mm.

36. A method according to claim 30, wherein said cylindrical cells constituting said cell form have an equal size of honeycomb sectional profile, each side of said cylindrical cells having a length of 0.5 to 3.0 mm.

37. A method according to claim 30, wherein said mat is a water absorbing mat.

38. A method according to claim 30, wherein said mat is a water and air-permeable mat.

39. A method according to claim 30, wherein said mat is made of non-woven fabric.

40. A method according to claim 38, wherein said water and air-permeable mat is made of non-woven fabric.

41. A method according to claim 30, wherein said dry pattern-course ceramic material and said base-course ceramic material are charged at their respective prescribed positions using masks each having an opening conforming to a shape of a corresponding pattern to be formed.

42. A method according to claim 30, further comprising the step of disturbing at least part of said pattern-course ceramic material and said base-course ceramic material after said step of removing said cell form from said main form.

43. A method according to claim 30, wherein said pattern-course ceramic material and said base-course ceramic material are supplied in their respective amounts capable of making said shaped article water-permeable.

44. A method according to claim 30, wherein at least one of said main form and said cell form is made of a deformable material and further comprising the step of deforming said at least one form having said pattern-course ceramic material and said base-course ceramic material accommodated therein before said step of causing said pattern-course ceramic material and said base-course ceramic material to set.

45. A method according to claim 44, wherein said deformable material is one member selected from the group consisting of rubber, synthetic rubber and plastic.

46. A method for producing a patterned ceramic shaped article, comprising the steps of:

laying a mat on an inside bottom surface of a main form for molding said shaped article;

disposing on said mat at a prescribed position a soluble cell form comprising a plurality of cylindrical cells which have an equal height and are arranged in a contiguous manner;

charging a prescribed amount of dry ceramic material for forming a pattern-course of said shaped article into a prescribed number of cells of said soluble cell form conforming to a shape of a pattern to be formed;

charging a prescribed amount of ceramic material for forming a base-course of said shaped article into a remaining space within said main form;

charging at least one of water and lubricant-bonding agent into said main form to cause said soluble cell form to dissolve and said pattern-course ceramic material and said base-course ceramic material to set under pressure within said main form into said shaped article with said at least one of water and lubricant-bonding agent, wherein said mat laid on said inside bottom surface of said main form permits an absorption of excess water or excess lubricant-bonding agent and a supply of said excess water or said excess lubricant-bonding agent to a portion of said ceramic materials which lack water or lubricant-bonding agent, and a degassing of said ceramic materials under said pressure;

removing said shaped article from said main form; and sintering said shaped article.

* * * * *